United States Patent [19]
Glocker et al.

[11] Patent Number: 5,954,926
[45] Date of Patent: Sep. 21, 1999

[54] GLOW DISCHARGE TREATMENT OF A WEB SUBSTRATE SURFACE IN A WEB COATING LINE

[75] Inventors: David A. Glocker, West Henrietta; Mark M. Romach, Rochester; Richard C. Soper, Victor; Evelio A. Perez-Albuerne, Rochester, all of N.Y.

[73] Assignee: Eastman Kodak Company, Rochester, N.Y.

[21] Appl. No.: 08/810,497

[22] Filed: Feb. 28, 1997

[51] Int. Cl.$^6$ ...................................................... B01J 19/08
[52] U.S. Cl. ............................................ 204/164; 427/536
[58] Field of Search ............................... 204/164; 427/536

[56] References Cited

U.S. PATENT DOCUMENTS

| | | | |
|---|---|---|---|
| 5,326,689 | 7/1994 | Murayama | 430/530 |
| 5,403,453 | 4/1995 | Roth et al. | 204/164 |
| 5,558,843 | 9/1996 | Glocker et al. | 422/186.05 |

FOREIGN PATENT DOCUMENTS

| | | |
|---|---|---|
| 76 13034 | 4/1975 | France . |
| 2058236 | 11/1970 | Germany . |
| 2308711 | 2/1973 | Germany . |
| 2523003 | 5/1975 | Germany . |
| 87-082290/12 | 7/1985 | Japan . |
| 87-082291/12 | 7/1985 | Japan . |
| 7166355 | 6/1995 | Japan . |
| 7166356 | 6/1995 | Japan . |
| 7603856 | 9/1976 | Netherlands . |

*Primary Examiner*—Kishor Mayekar
*Attorney, Agent, or Firm*—Arthur H. Rosenstein

[57] ABSTRACT

Apparatus capable of sustained glow discharge at atmospheric pressure mounted along the web path in a web coating machine ahead of the point of coating application, for glow discharge treatment of the surface of a polymeric web shortly before coating. Latencies of treatment (the time between treatment and coating) approaching zero are possible, minimizing or preventing loss of treatment effect and maximizing adherence of a coated layer to the web surface. Elimination of one or more conventional subbing adhesion layers on the web surface is possible in some applications.

10 Claims, 7 Drawing Sheets

GLOW DISCHARGE TREATMENT OF A WEB SUBSTRATE SURFACE IN A WEB COATING LINE

FIELD OF THE INVENTION

The invention relates to apparatus and methods for treating surfaces of plastic polymeric web substrates with electrical discharges at ambient atmospheric pressures to alter the wettability and adhesion of those surfaces to aqueous formulations coated subsequently to the treated surfaces, and particularly to apparatus and methods for such treatment in a coating line shortly before the coating application point.

BACKGROUND OF THE INVENTION

It is known that, under certain conditions, stable diffuse glow discharges can be produced near or at atmospheric pressures. Articles that discuss stable glow discharges are listed in U.S. Pat. No. 5,558,843 issued Sep. 24, 1996 to Glocker et al, which is incorporated herein by reference. Work in this area has been limited and directed primarily at etching of photoresist and deposition of materials. These articles indicate that a reliable method of producing diffuse glow discharges at atmospheric pressure includes the use of helium gas. The work reported in the literature has been reproduced and found to be reliable.

As disclosed in the above-referenced patent, it was found that, by using mixtures of gases including helium, stable discharges can be produced at atmospheric pressure, which discharges are able to improve dramatically the wettability and adhesion of photographic emulsions to otherwise difficult-to-coat webs comprising thermoplastic polymeric materials such as polyethylene and polyesters such as polyethylene terephthalate, and polyethylene naphthalate.

It is known to glow-discharge treat plastic surfaces in substantial vacuum to improve both the wettability of the surface to aqueous coatings and the adhesion of such coatings to the surface when dried. Such treatment is performed at pressures in the range of 1 to 700 milliTorr in the presence of, for example, nitrogen and/or one or more of the noble gases (see Japanese Kokai Hei 7[1995]– 166355 and Hei 7[1995]–166356). Improved wettability from vacuum glow discharge treatment, as measured by a decrease in the internal contact angle between a water drop and the plastic surface, can persist with little decay over a period of at least several weeks between treatment and aqueous coating. Improved adhesion can also remain virtually unchanged.

Glow discharge treating of webs in vacuum is most conveniently performed in a separate manufacturing step in a vacuum treatment machine. While operationally convenient, this method of treatment is very capital intensive and also adds substantially to the overall manufacturing cost of, for example, a photographic product using a thermoplastic resin web as the photographic film or paper base.

U.S. Pat. No. 5,558,843 issued Sep. 24, 1996, discloses method and apparatus for treating polyester web with glow discharge at atmospheric pressure, using gas mixtures including helium. The discovery is important because it permits treatment of conveyed rolls of web in an off-line machine at atmospheric pressure. Treatment is typically carried out on an apparatus wherein the web substrate is unwound from a stock roll, conveyed through a glow discharge region for treatment, and then wound into a treated stock roll. The roll may be placed in storage until needed for coating or it may be sent directly to a coating machine for application of layers to the treated surface.

At the time of the above discovery, it was believed that the effect produced on the web surface by the novel glow discharge treatment at atmospheric pressure was the same as that produced by previously-known glow discharge treatments at substantial sub-atmospheric pressures. The expected decrease in wettability contact angle and improvement in coated-layer adhesion supported this conclusion.

We now have found a shortcoming of such off-line treatment of webs, namely, a general decay in the improved adhesion effect (although, surprisingly, not in the wettability angle) as a function of elapsed time between glow discharge treatment at atmospheric pressure and coating. The present invention provides method and apparatus for avoiding this shortcoming.

The time period between treatment and coating is defined as the "latency" of the treatment. Since some treated rolls may be sent to storage while others are sent directly for coating, different rolls may have differing post-treatment histories and therefore differing latencies, which may result in roll-to-roll product variability for adhesion. Where the treatment effect decays rapidly, even the head and tail portions of an individual stock roll may exhibit substantially different adhesions.

Thus, a need exists for a process whereby all portions of all rolls being coated are provided with equal latency. Further, a need exists for a process whereby the latency is minimized, and preferably eliminated.

In the known manufacture of stock rolls of webs formed by melt cast extrusion of some thermoplastic resins, for example polyethylene terephthalate, the as-cast polymer ribbon typically is coated with a chloride-containing latex subbing layer, or primer, before lengthwise and widthwise stretching to achieve end use sheet dimensions. Typically, an additional gelatin-containing subbing layer must be applied to the latex sub before photographic layers can be coated. Omission of either the latex sub or the gel sub can result in adhesion failure of subsequently-coated photographic layers.

Thus, a need exists for a process to increase the coatability and adhesion properties of bare polymeric webs, especially webs containing a polyester polymer, sufficiently to permit omission of either or both of the subbing layers, at a substantial savings in manufacturing cost of coated product.

In the known manufacture of photographic paper including a cellulose-based web, the web typically is made waterproof, to minimize the uptake of processing chemicals during photographic development and fixing, by being impregnated on one or both sides with a bonded layer of a polyolefin, typically polyethylene. So-called "resin-coated" or "RC" paper as cast has unsatisfactory coatability and adhesion of aqueous formulations. Current practice is to treat the polyolefin surface with a corona discharge prior to the application of aqueous formulations.

This electrically intensive procedure can lead to irregular or non-uniform coatings and can cause serious damage to the photographic product if control is not tightly maintained.

Thus a need exists for a safe electrostatic process to increase the coatability and adhesion properties of polyolefin layers on resin-coated photographic papers.

It is a principal object of the invention to provide an improved apparatus and method for coating an aqueous formulation to a bare polymeric web substrate surface wherein the surface to be coated may be treated by glow discharge at atmospheric pressure shortly before coating.

It is a further object of the invention to provide an improved apparatus and method for coating an aqueous formulation to a bare polymeric web substrate surface wherein glow discharge treatment of the web is performed at atmospheric pressure in the web path on a coating machine ahead of the web coating application point.

It is a still further object of the invention to provide an improved apparatus and method for coating an aqueous formulation to a bare polymeric web substrate surface wherein glow discharge treatment of the web is performed at substantially atmospheric pressure (from 600 to 800 Torr) within two minutes prior to coating, and preferably within one second.

It is a still further object of the invention to provide an improved apparatus and method for atmospheric glow discharge treatment of successive stock rolls of a polymeric web substrate prior to coating whereby latency is constant and identical for all areas of all rolls.

It is a still further object of the invention to provide an improved apparatus and method for atmospheric glow discharge treatment of polymeric web substrates whereby one or more conventional latex and/or gelatin subbing layers on the web may be omitted.

SUMMARY OF THE INVENTION

The apparatus and method of the invention are useful in providing polymeric web substrates having high wettability and high adhesion to aqueous coatings.

Briefly described, the invention provides apparatus and method for treating and coating webs to have high coatability and adhesion to aqueous formulations by glow discharge surface treatment of a web substrate being conveyed along a web path in a coating line, also known as a coating machine, at substantially atmospheric pressure before application of a coating to the treated surface along a later portion of the same web path. A gas mixture comprising helium and nitrogen and/or oxygen permits formation of a stable glow discharge over a wide range of voltages and frequencies at ambient atmospheric pressure. This enables the glow discharge apparatus and process to be incorporated into a coating machine ahead of the coating application point, allowing minimization or virtual elimination of treatment decay through latency loss.

The glow discharge apparatus comprises a first electrode having a first surface adjacent the web conveyance path in a coating machine shortly before the coating point, a second electrode having a second surface opposite the first surface and also adjacent the web path, means for introducing gas between the first and second electrodes, and a power supply coupled between the first and second electrodes for sustaining a glow discharge therebetween, at least one of the first and second surfaces being insulated. The power supply is operable at a potential of between 0.5 kV and 20 kV and at a frequency of between 60 Hz and 40 MHz (megaHertz).

In an apparatus in accordance with the present invention, the first and second electrodes may be adjacent opposite sides of the web substrate, the web path extending therebetween, or they may be both adjacent one side of the web substrate. The gas may be pure helium; a mixture of helium and nitrogen; a mixture of helium, nitrogen, and oxygen; a mixture of helium and oxygen; or a mixture of helium, oxygen, and a fluorine-containing compound, for example, carbon tetrafluoride.

In a preferred embodiment, one of the electrodes is a conveyance roller for the web substrate in the web path of the coating machine. Most preferably, the electrode roller is also a backing roller for supporting the web substrate for application of the coating to the treated surface immediately after treatment.

A plurality of glow discharge devices may be used in series as needed to increase the treatment of low-response substrates or to permit increases in the line speed of the coating machine.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which.

DETAILED DESCRIPTION OF THE INVENTION

The present invention provides apparatus and method for treating and coating webs to have high coatability and adhesion to aqueous formulations by the glow discharge treatment of web substrates at atmospheric pressure in a coating machine shortly before the coating of one or more of the aqueous layers to the substrate surface, and for providing uniform latency of glow discharge treatment over all areas of web to be coated. The web may be prepared by stretching a ribbon of material lengthwise and widthwise prior to heat setting and annealing.

Figure 1:
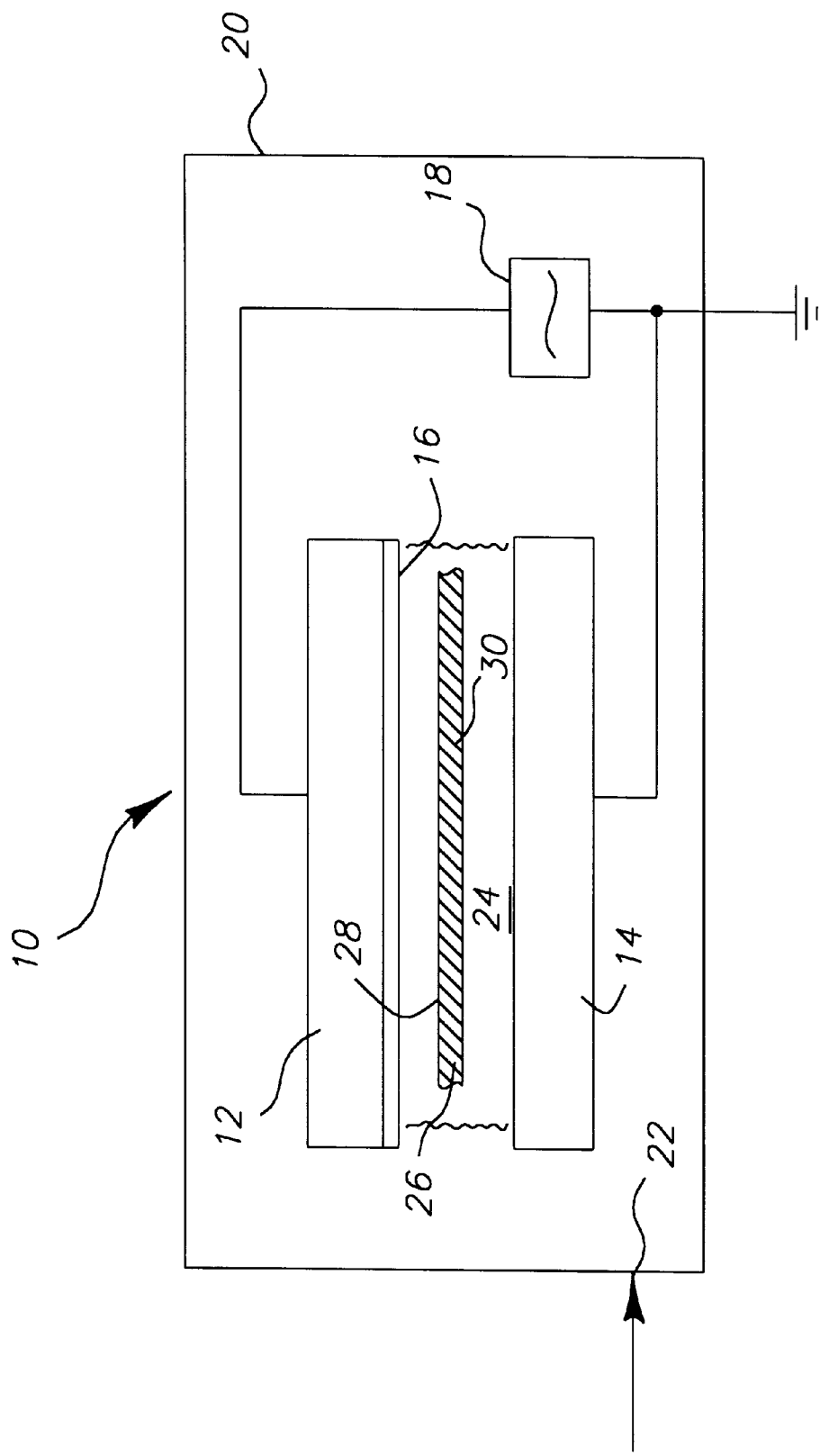
FIG. 1 is a schematic view of a prior art glow discharge apparatus, showing a web being treated by being passed through a glow discharge between first and second electrodes.

Referring to FIG. 1, a prior art glow discharge device 10 is shown which illustrates the basic principles of atmospheric glow discharge treatment in accordance with the invention. Device 10 has first and second spaced apart electrodes 12 and 14, respectively, at least one of which has an insulating layer 16. The electrodes are electrically connected by a grounded power source 18 and are surrounded by an enclosure 20. A gas mixture including helium and, preferably, nitrogen and/or oxygen is metered into the enclosure through an entry port 22 and occupies the region between the electrodes. When energized by the power source, preferably at a voltage between about 0.5 kV and 20 kV and at a frequency between about 60 Hz and 40 MHz, the gas sustains a glow discharge 24 in this region. A polymeric web substrate 26, seen in cross-section on end in FIG. 1, is passed through the glow discharge 24 between the electrodes, and the first and second surfaces thereof 28 and 30, respectively, become altered. Either surface can be curved to be substantially conformable with the substrate surface at a substantially uniform distance therefrom. The altering treatment can change both the wettability of the surfaces to subsequent aqueous coatings and the adhesion of the surfaces to those coatings after they have been dried to form layers.

Figure 2:
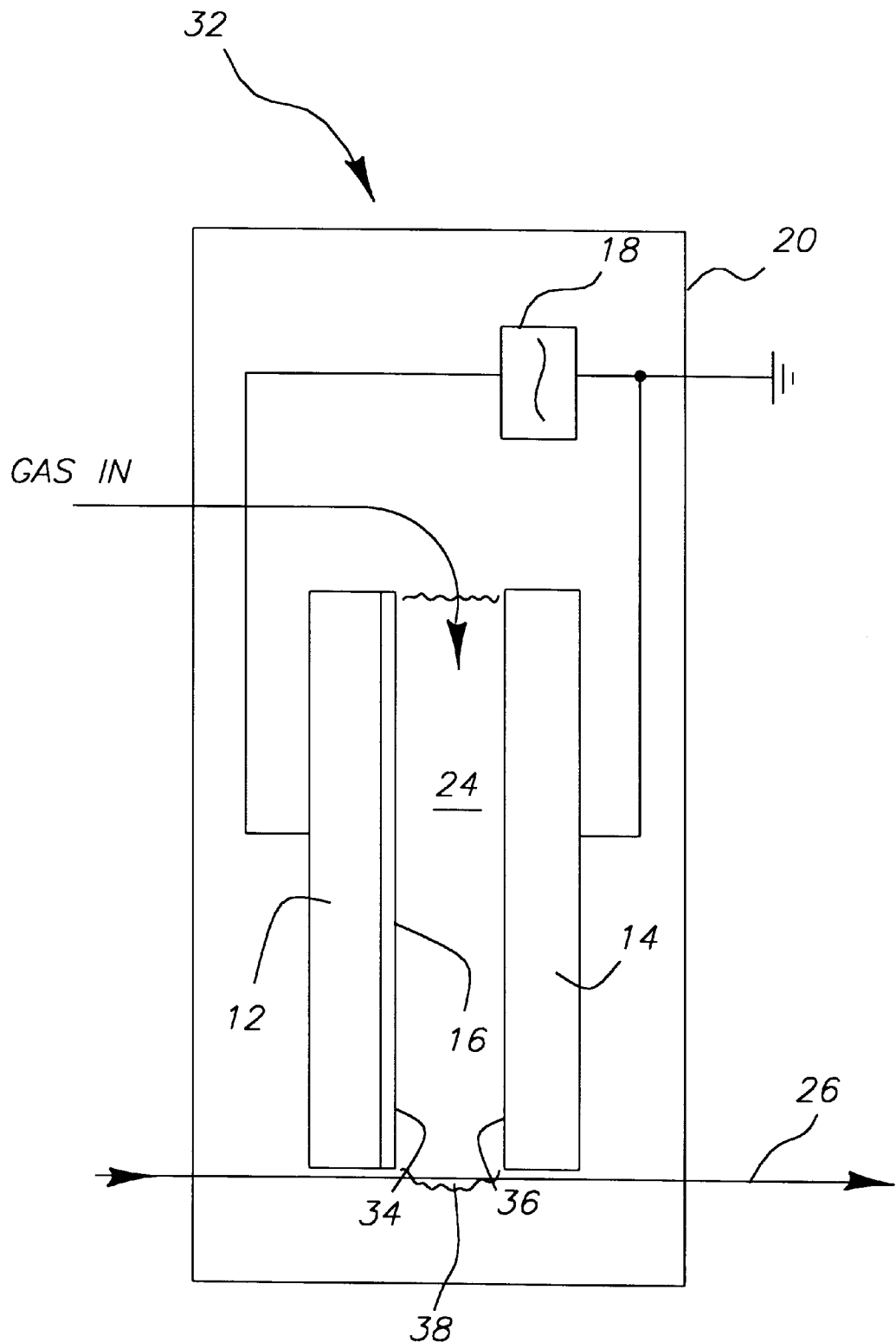
FIG. 2 is a schematic view similar to that of FIG. 1, showing a web being glow-discharge treated by passing by the ends of first and second electrodes.

A second embodiment 32 of glow discharge apparatus is shown in FIG. 2. In this embodiment, the gas is introduced directly and continuously into the region between electrodes 12 and 14 and preferably parallel to the electrode surfaces 34 and 36. The momentum of the flowing gas displaces the glow discharge 24 from between the electrodes, carrying a mixture of ions, radicals, and other reactive species, and resulting in an active region 38 beyond the electrodes through which substrate 26 can be conveyed for surface treatment. The apparatus can also comprise third and fourth electrodes spaced apart and disposed along said web path ahead of said first and second electrodes, at least one of said third and fourth electrodes being insulated, and further comprising means for providing a gas comprising helium between said third and fourth electrodes, and further comprising a power supply coupled between said third and fourth electrodes for sustaining a second glow discharge therebetween.

Figure 3:
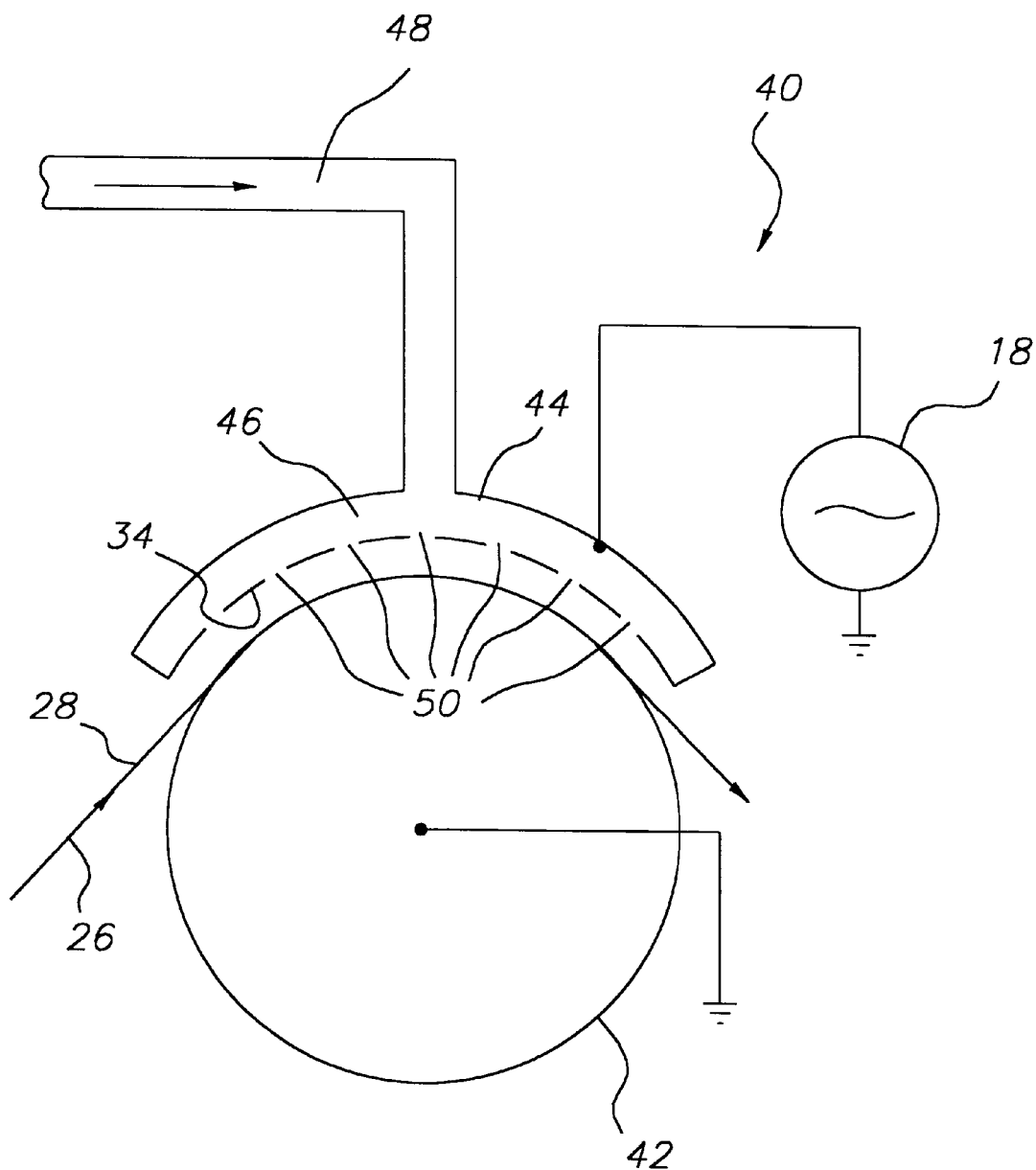
FIG. 3 is a schematic view of a prior art glow discharge apparatus for treatment of webs, similar to the apparatus disclosed in U.S. Pat. No. 5,558,843.

A preferred embodiment 40 of glow discharge apparatus, shown in FIG. 3, is substantially as disclosed in the above-referenced U.S. Pat. No. 5,558,843. A grounded metal roller 42 defines a first electrode which can be anodized aluminum and conveys web substrate 26 through an arc of rotation. A conformal shoe electrode 44, spaced from roller 42 by preferably about 0.2 mm to 10 mm, includes a manifold chamber 46 supplied with gas through a supply conduit 48 and in communication with the substrate first surface 28 through apertures 50. At least one of electrodes 42 and 44 is insulated. Preferably, shoe electrode 44 is formed of aluminum and is insulated by being anodized on surface 34. As is well known in atmospheric glow discharge operation, insulation of at least one of the electrodes is necessary to ensure a uniform charge density and to prevent formation of electrical streamers or arcs. From only glow discharge considerations, roller 42 can equally well be the high voltage electrode and shoe 44 the grounded electrode, but operationally working with the roller at ground is preferable. A glow discharge apparatus as disclosed in our pending application, Ser. No. 08/685,353 filed Jul. 23, 1996, would also be useful in treating web in accordance with the present invention.

We have found that the salutary effect of glow discharge on polymeric web surfaces in helium at atmospheric pressure can decay with time between treatment and coating. The time between treatment and coating can be from 5 minutes or less and preferably 2 minutes or less. In some preferred embodiments the time can be 30 seconds or less. The effect of the short time period is shown in the following example:

EXAMPLE 1

A web of polyethylene naphthalate was treated on the shoe electrode treater shown in FIG. 3 under the following conditions: 2.25 mm spacing between electrodes; 450 kHz frequency; power level 600–650 watts; gas flow of 8 liters/min of helium and 0.15 liters/min of nitrogen; web speed 3 m/min. Different portions of the treated web were subsequently coated with a photographic emulsion at various periods of time after treatment. After being set and dried, the coatings were tested for adhesion substantially as described in U.S. Pat. No. 5,558,843 with the following results (in this aggravated test, removals of less than 10% are judged adequate for normal photographic use):

| Latency Period (minutes) | Average Percent Dried Coating Removed | Contact Angle |
|---|---|---|
|  | Bare PEN | 62° |
| 60 | 62 | 32° |
| 45 | 62 | 33° |
| 30 | 64 | 34° |
| 15 | 42 | 33° |
| 5 | 15 | 30° |
| 2 | 8 | 27° |

The example shows that for this coating system and web substrate, substantial loss in adhesion occurs within only a few minutes of latency. Thus, short latencies are shown to be critical. We have found that, using apparatus and methods in accordance with the present invention, latencies of a few seconds are easily obtainable, and in some applications latency can be reduced to virtually zero, as described hereinbelow.

Of interest is the fact that the wetting contact angle, indicative of wettability of the support by aqueous formulations, changes only slightly while the adhesion is changing very substantially. In vacuum glow discharge treatment, contact angle is a useful correlate and predictor of adhesion. In atmospheric glow discharge treatment, the correlation is not maintained.

Referring to FIGS. 4 through 7, a coating machine 52 conveys a web substrate 26 over rollers 54, which may be either idle rollers or drive rollers, and around a coating backing roller 56 which supports the web for the application of a liquid coating via slot die hopper 58. Application can also be made by any of various other known coating applicators, for example, a cascade hopper 60 (FIG. 7), curtain coating hopper, extrusion/slide hopper, air knife metered applicator, kiss coater, fountain applicator, gravure roller, and offset roller. Web 26 may be supplied to the coating machine as a stock roll to be unwound (not shown), or coating machine 52 may be integral with a known web manufacturing machine (not shown) wherein molten polymer is extruded from an extrusion die as a relatively thick ribbon which is then oriented by stretching lengthwise and widthwise to obtain the desired sheet dimensions of the web.

Figure 4:
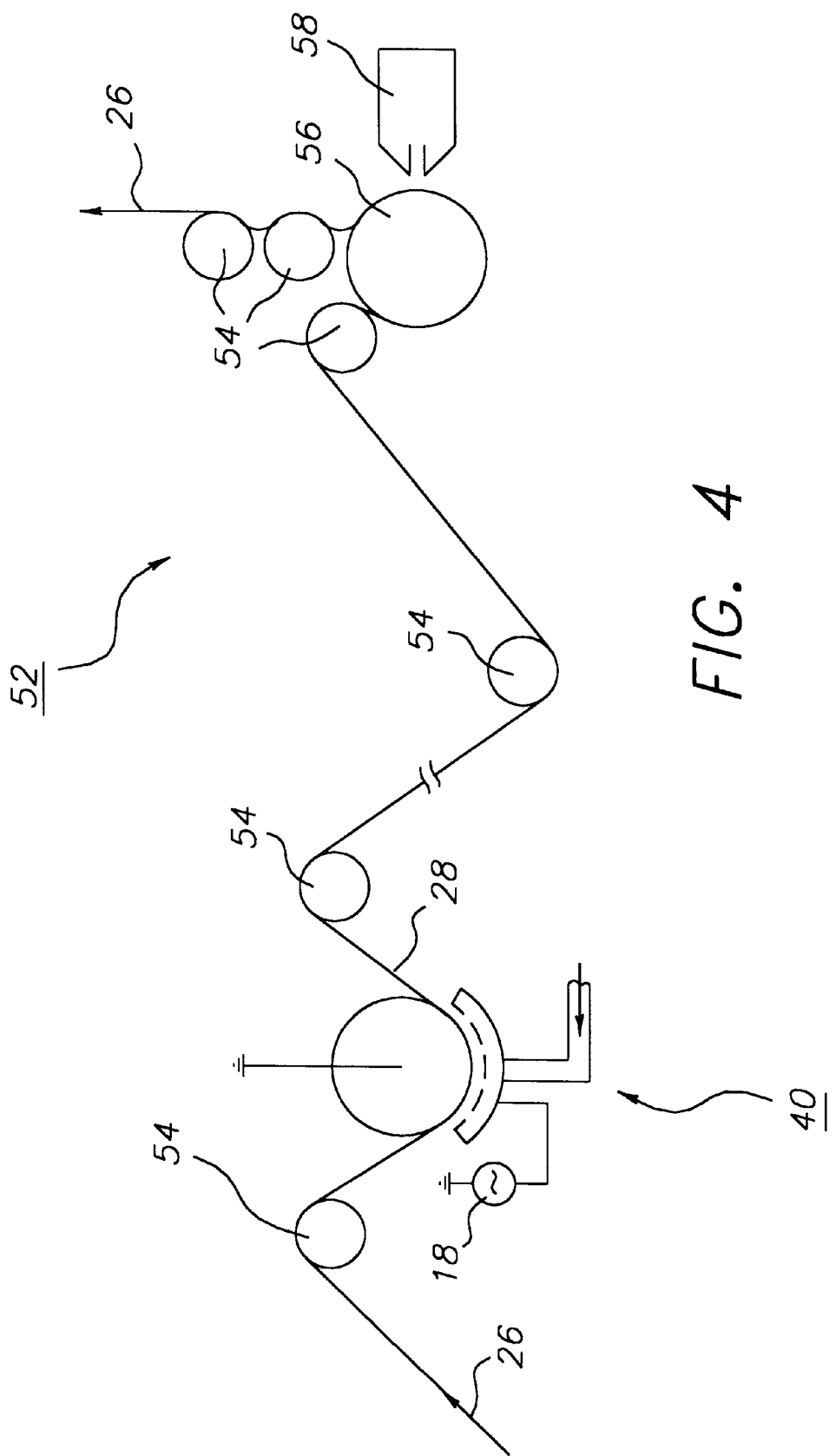
FIG. 4 is a schematic diagram of a portion of a machine for the continuous coating of a layer on a substrate, showing the web being treated with the glow discharge apparatus shown in FIG. 3 at a point in the web path ahead of the coating point, the coating being applied via an extrusion hopper.

In FIG. 4, along the web path at a convenient distance ahead of the coating applicator 58 is disposed a glow discharge apparatus 40 like that shown in FIG. 3. Other types of apparatus, for example those shown in FIGS. 1 and 2, may be used instead, but apparatus 40 is currently preferred because it includes a roller and can participate positively in conveying the web through the machine. First web surface 28 is glow discharge treated by device 40 and the web wettability and adhesion characteristics are substantially enhanced or diminished thereby. For many applications, enhancement is desired, but in other applications, for example, in manufacturing stripping films or interleaving, it is desirable to diminish the adhesion of the coated layer to the substrate. Diminished adhesion can be achieved through addition of small amounts of, for example, specific fluorocarbons to the active gas stream, as described in the cited Kokai references.

Figure 5:
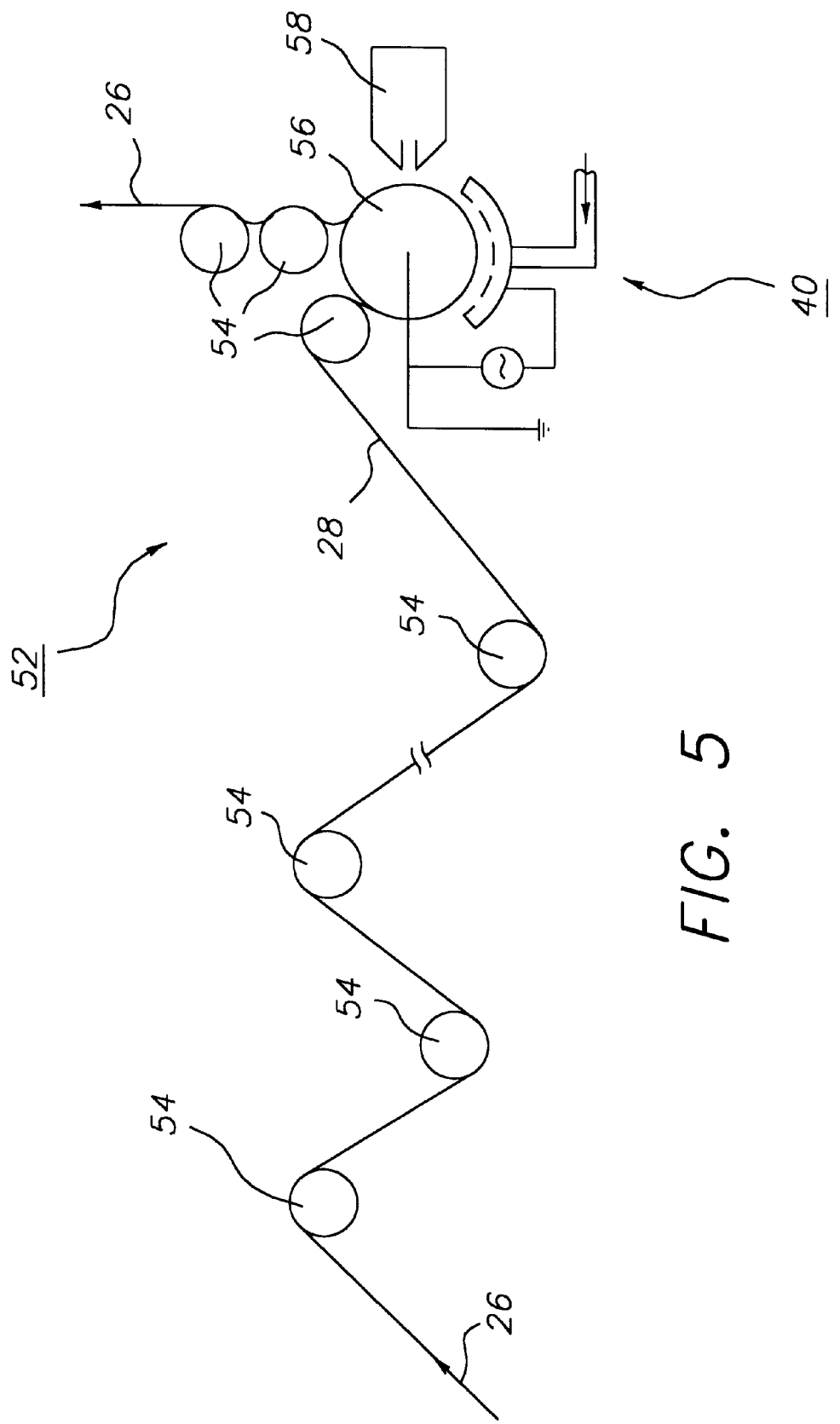
FIG. 5 is a schematic diagram like that of FIG. 4, showing the coating backing roller also serving as the grounded electrode in a glow discharge apparatus, the treatment thus being applied immediately before coating (latency approximately zero)
Figure 6:
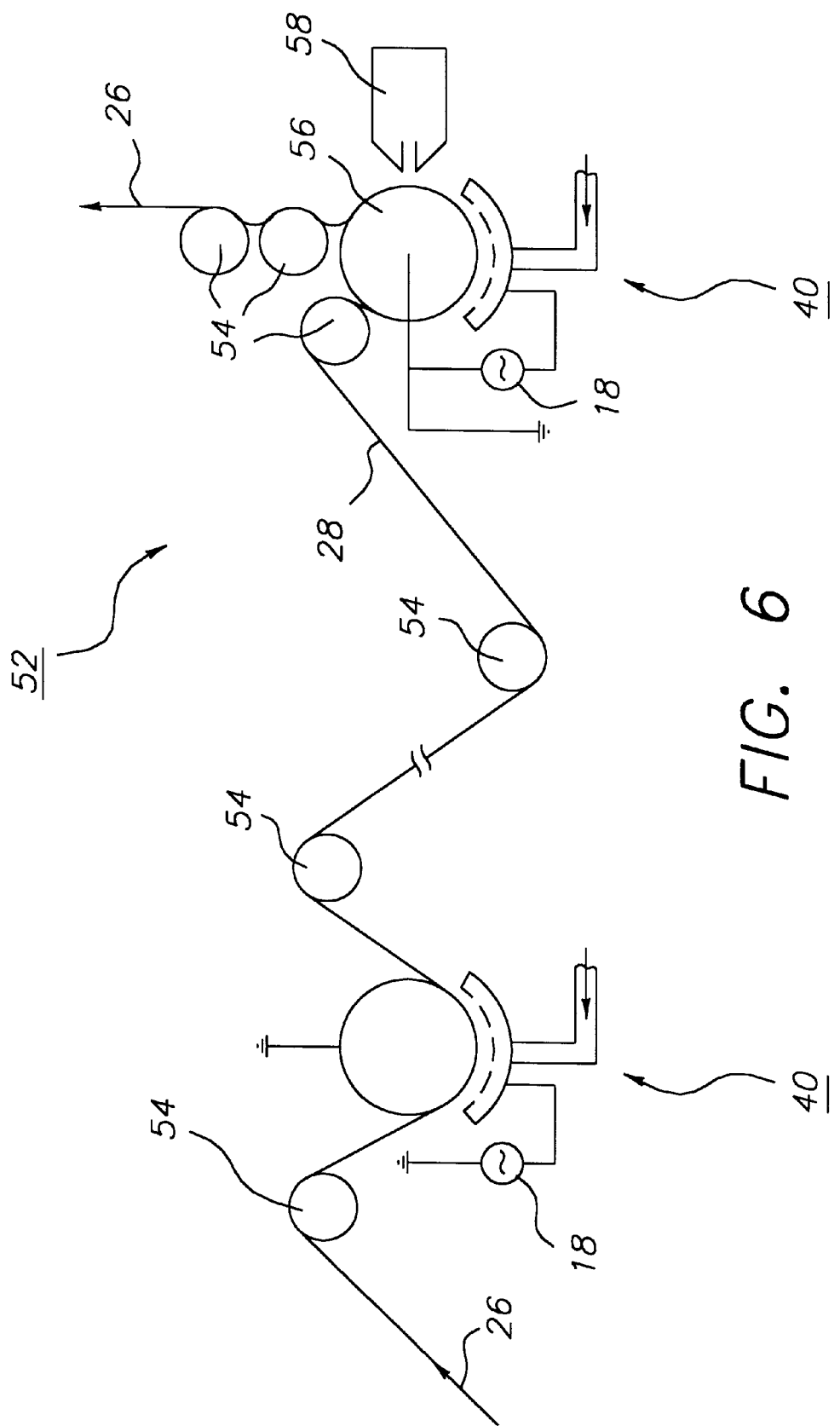
FIG. 6 is a schematic diagram like that of FIGS. 4 and 5, showing the glow discharge apparatus of FIGS. 4 and 5 combined in a single coating line.

In a preferred embodiment, as shown in FIG. 5, grounded roller 42 of a glow discharge apparatus 40 is also the backing roller 56 for the coating applicator 58. In this configuration, the distance along the web path between the glow discharge and the coating point is in the order of centimeters; and at typical coating speeds of several hundreds of meters per minute, latency is virtually zero, resulting in maximum adhesion of the coated layer. Since the effect of glow discharge treatment here is not reduced by time and hence is higher than in any other possible configuration, higher coating machine speeds or reduced treatment power levels may be enabled.

Where still higher machine speeds are desired, a plurality of glow discharge apparatus may be employed in series along the web path, as shown in FIG. 6, combining the configurations shown in FIGS. 4 and 5.

Figure 7:
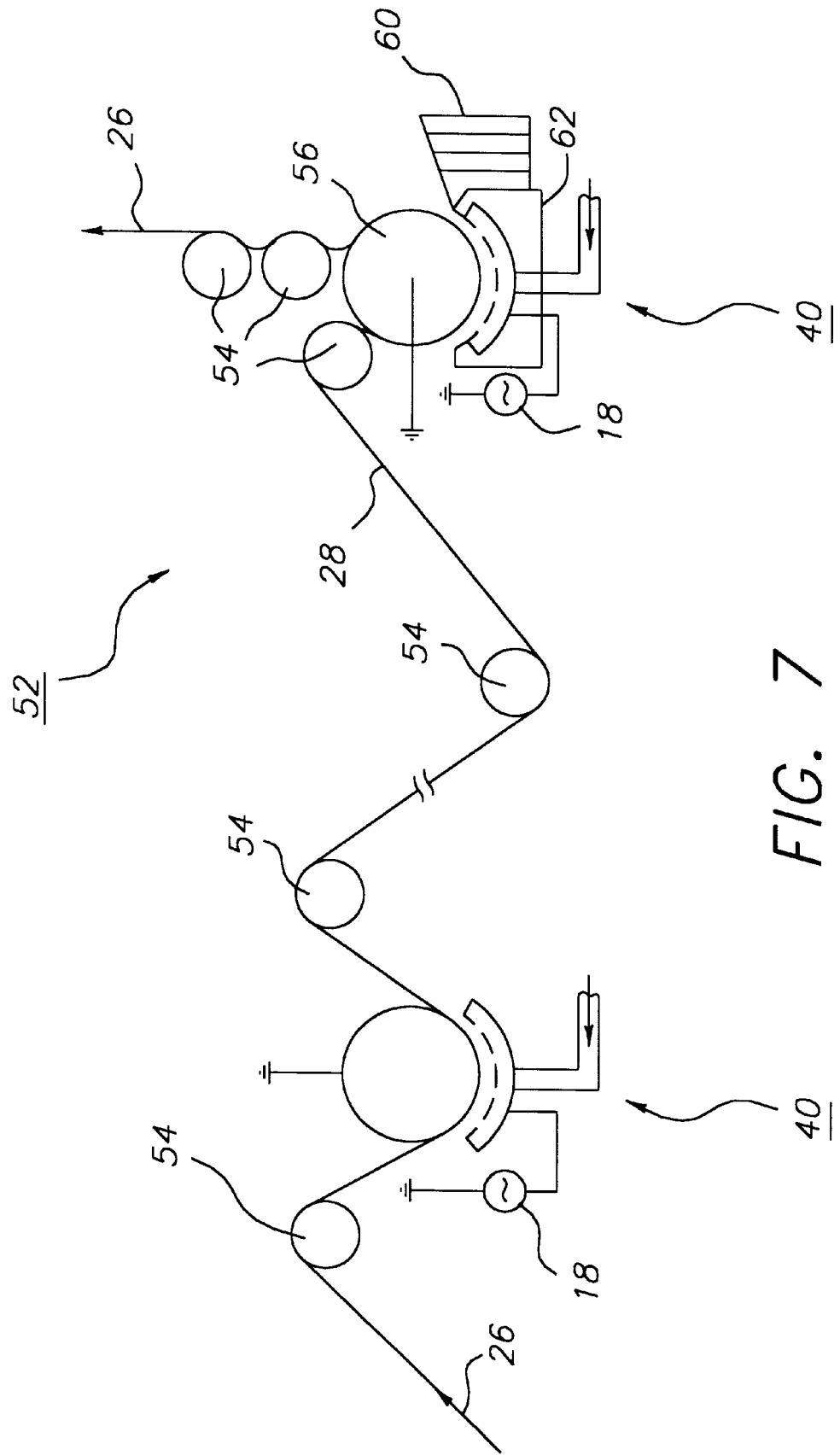
FIG. 7 is a schematic diagram like FIG. 6, showing the coating being applied via a cascade hopper, also known as a suction slide hopper, the shoe electrode being resident within the hopper suction trough.

Multiple-slide cascade hoppers having suction troughs are well known in the coating of photographic films and papers on melt-extruded polymer substrates such as polyethylene terephthalate, polyethylene naphthalate, polypropylene and cellulose and polyolefin coatings bonded to paper stock. In FIG. 7, one glow discharge device 40 is shown residing within the suction trough 62 of cascade hopper 60. This preferred location may present challenges in baffling the electrode to prevent fouling with waste emulsion during preparation of the hopper for coating, but the engineering solutions are straightforward. Likewise, the glow discharge may fog light-sensitive emulsions, and it may be necessary in some applications either to visually baffle the glow discharge from the coating nip or to rotate the shoe electrode to the back side of the backing roller to break line of sight communication of the glow discharge and the coating nip.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Parts list 10 prior art glow discharge device
12 first electrode
14 second electrode
16 insulating layer
18 power source
20 enclosure
22 entry port in 20
24 glow discharge
26 polymeric web substrate
28 first surface of 26
30 second surface of 26
32 second embodiment of glow discharge device
34 surface of 12
36 surface of 14
38 active region in 24
40 preferred embodiment of glow discharge device
42 grounded metal roller
44 insulated shoe electrode
46 manifold chamber in 44
48 gas conduit
50 apertures in 44
52 coating machine
54 rollers
56 backing roller
58 slot die hopper
60 suction slide hopper
62 suction trough

We claim:

1. A method for making a coated web substrate having high adhesion of the coating to a surface of said substrate, comprising the steps of:
    a) providing a glow discharge apparatus along a first portion of a web conveyance path;
    b) providing a coating apparatus along a second portion of said web conveyance path;
    c) treating said substrate surface by conveying said substrate in said web path past said glow discharge apparatus at substantially atmospheric pressure; and
    d) coating said treated substrate surface by conveying said treated substrate in said web path past said coating apparatus;
    wherein the time between said treating step and said coating step is less than 2 minutes.

2. A method in accordance with claim 1 further comprising the steps of:
    a) extruding a ribbon of substrate material from a melt extruder;
    b) orienting said extruded ribbon by stretching said ribbon both lengthwise and widthwise to form said web substrate to be treated; and
    c) heat setting said orientation by heating the web substrate to a temperature above the glass transition temperature of said substrate.

3. A method in accordance with claim 1 wherein the time between said treating step and said coating step is less than thirty seconds.

4. A method in accordance with claim 1 wherein the time between said treating step and said coating step is less than one second.

5. A method in accordance with claim 1 wherein said treatment of step c) is carried out at substantially atmospheric pressure.

6. A method in accordance with claim 1 wherein said treatment of step c) is carried out at a potential of between 0.5 kV and 20 kV and at a frequency of between 60 Hz and 40 MHz.

7. A method in accordance with claim 1 wherein said treatment of step c) is carried out in the presence of helium.

8. A method in accordance with claim 1 wherein said glow discharge apparatus and said coating apparatus are disposed in a web coating machine.

9. A method in accordance with claim 1 wherein said coating apparatus includes a coating applicator selected from the group consisting of cascade hopper, curtain coating hopper, slot die hopper, extrusion/slide hopper, air knife metered applicator, fountain applicator, gravure roller, and offset roller.

10. A method in accordance with claim 1 wherein said web substrate includes a material selected from the group consisting of polyethylene terephthalate, polyethylene naphthalate, polyethylene, polypropylene, and cellulose.

* * * * *